United States Patent Office 2,880,099
Patented Mar. 31, 1959

2,880,099

METHODS OF MAKING CLAY PRODUCTS AND IMPROVED CLAY PRODUCTS

Ludwig F. Audrieth, Urbana, Ill., assignor to Victor Chemical Works, a corporation of Illinois No Drawing. Application October 14, 1953
Serial No. 386,111

9 Claims. (Cl. 106—73)

This invention relates to methods of making improved clay products and to improved clay products. I have now discovered that ordinary common brick or tile may be greatly improved in quality by the inclusion of small amounts of sodium meta, pyro or polyphosphates in the clay matrix prior to the molding and firing of the finished shapes.

In the normal manufacture of common stock, wall and drain tile and the like the variations in the quality of the clay deposits result in wide variations in the color, appearance, and strength of the "green" shapes and finished products. In the manufacture of high quality "face" bricks it has been necessary to select clay from particular deposits having the necessary qualities for such products. Thus, many brick manufacturers were unable to make "face" quality bricks from their available deposits. One of the particular difficulties has been in the production of a uniformly red colored brick. Another difficulty has been in the effort to eliminate or minimize the irregular development of white "bloom" spots on the brick surfaces. This "bloom" or "scum" is probably due to the high calcium content found in most non-refractory clays. This calcium content is probably also responsible for the yellowish color of most common brick. Barium carbonate is sometimes used to reduce the "bloom" but does not improve the color of the brick.

In the practice of the present invention the above difficvulties are substantially eliminated, and it is possible to produce "common" brick having the color, appearance and qualities of "face" brick from clay deposits heretofore unsuitable for this purpose.

In the making of brick or clay tile under the new procedure, from one-half to five percent of the sodium metaphosphates, tetrasodium pyrophosphate or sodium tripolyphosphate is mixed with the normally dry clay and sufficient water is added to bring the mixture to a satisfactory consistency for extrusion or molding. The molded shape is then fired in a kiln at a temperature of about 1800°–1900° F. for several days. The resulting product has a uniform red color, the depth of shade varying with the amount and type of phosphate added. No white "bloom" is present on the surface of these articles. The internal structure shows a dense uniform fine grain of substantially the same color as the surface. The compressive strength is much higher than that of similar shapes made without the added phosphate salts.

The following experiments compare the advantages of brick made with and without the added pyro and polyphosphates.

Using an ordinary brick clay, mixes were made up with uniform amounts of water, mixed, extruded and fired under the same conditions. In these experiments 10 pounds of uniformly dry clay was thoroughly mixed with 2 pounds of water and varying amounts of tetrasodium pyrophosphate and sodium tripolyphosphate and the mixtures allowed to stand for about 6–10 hours at room temperature to permit good moisture obsorption and expansion by the clay. The mixtures were then forced through a laboratory extruder under uniform pressure into one inch square bars and cut into five inch long test pieces. These "green" shapes were allowed to dry for 72 hours at room temperature and placed in an oven at 200° F. and the temperature raised over a 24 hour period to about 1860° F. The sample brick bars were allowed to cool and tested for comparative qualities.

Mix No. 1 contained no additive.
Mix No. 2 contained 0.5% of tetrasodium pyrophosphate ($Na_4P_2O_7$).
Mix No. 3 contained 1.0% of tetrasodium pyrophosphate ($Na_4P_2O_7$).
Mix No. 4 contained 0.5% of sodium tripolyphosphate ($Na_5P_3O_{10}$).
Mix No. 5 contained 1.0% of sodium tripolyphosphate ($Na_5P_3O_{10}$).

Qualitative comparison of the "green" unfired bars for scratching and break resistance indicated about 50% higher "green" strength for the phosphate containing bars.

Color and appearance comparison of the fired test bars show a vivid distinction. The No. 1 bar (represents prior art practice) was of light reddish yellow color. The surface exhibited a severe irregular white "bloom," whereas, the bars made from the mixes containing pyro and polyphosphates exhibited no "bloom" and were of uniform red color, the depth of color increasing from light red in bar No. 2 to dark red in bar No. 3 as the amount of tetrasodium pyrophosphate used was increased from 0.5% to 1.0%. Where sodium tripolyphosphate was employed the intensity of the red color was not as marked as with the pyrophosphate, though of much darker red color than the blank (bar No. 1). Somewhat darker color development may be obtained through the use of larger amounts of the phosphate compounds, through no appreciable advantage is obtained in using more than about 5% of the additive phosphate.

Internal structure was observed by breaking the bars and examining the fractured faces. For example, the No. 3 bar showed a deep red, uniformly grained structure, whereas the blank No. 1 bar showed a light yellow, irregular, folded or layered structure.

Compression tests on the brick bars illustrate the outstanding increase in crushing strength resulting from the use of the pyro and polyphosphate additives. Three bars of each type were tested and the average crushing strength in pounds per square inch are shown in the following table:

| | Crushing strength, p.s.i. |
|---|---|
| Bar No. 1 | 6,713 |
| Bar No. 2 | 10,283 |
| Bar No. 3 | 14,927 |
| Bar No. 4 | 8,120 |
| Bar No. 5 | 13,357 |

The results in the above table show that the use of 1% of either sodium pyro or sodium polyphosphate in the brick mix will at least double the crushing strength of the finished brick.

Under the improved procedure of making brick and clay tile it is essential to obtain a fairly uniform distribution of the pyro or polyphosphate throughout the clay mixture prior to molding or extruding step. This distribution may be obtained by mixing the dry powdered pyro or polyphosphate with the clay and subsequently adding the desired amount of water, or the distribution may be made by first dissolving the phosphate addition in a portion of the water used to bring the clay to the desired consistency for molding or extruding. The latter procedure, of course, will depend on the amount of water present in the starting clay. The plastic clay mass will normally contain about 20 to 30% water, preferably about 20-25%.

Sodium metaphosphates, such as exemplified by sodium hexametaphosphate, also give substantially the same results as the pyro or polyphosphates and are used in substantially the same amounts and in substantially the same ways.

The added meta, pyro or polyphosphate is believed to have a combination effect in dispersing the clay, solubilizing or sequestering calcium and iron with the formation of some complex compound which on firing yields a dispersed red pigment and an insoluble calcium compound preventing its migration to the surface and the formation of a white "bloom." Further it is believed that the improved dispersion of the clay facilitates the extrusion operation and gives increased green strength, and that the presence of the sodium so changes the sintering conditions as to permit better bonding of the clay particles and yield a fired product of high crushing strength.

Having described my invention as related to the embodiments described herein, it is my intention that the invention be not limited by any of the details of description, unless otherwise specified, but rather be construed broadly within its spirit and scope as set out in the accompanying claims.

I claim:

1. In the manufacture of shaped clay products from a clay mass, the method which comprises admixing non-refractory clay with about 0.5% to about 5% by weight, based on the weight of clay, of a member of the class consisting of sodium metaphosphates, sodium pyrophosphates, and sodium polyphosphates, and sufficient water to form a clay mass, shaping said mass, and heating said mass at a firing temperature.

2. The method of claim 1 wherein the firing temperature is about 1800° to 1900° F.

3. The method of claim 1 wherein the phosphate is tetrasodium pyrophosphate.

4. The method of claim 1 wherein the phosphate is sodium tripolyphosphate.

5. The method of claim 1 wherein the phosphate is sodium hexametaphosphate.

6. A shaped and fired clay product consisting essentially of nonrefractory clay and about 0.5% to about 5% by weight, based on the weight of the clay, of a member of the class consisting of sodium metaphosphates, sodium pyrophosphates, and sodium polyphosphates which serves to improve the texture, color, and compressive strength of the product.

7. The product of claim 6 wherein the phosphate is tetrasodium pyrophosphate.

8. The product of claim 6 wherein the phosphate is sodium tripolyphosphate.

9. The product of claim 6 wherein the phosphate is sodium hexametaphosphate.

References Cited in the file of this patent

UNITED STATES PATENTS

| 2,266,646 | Lower | Dec. 16, 1941 |
| 2,493,809 | Garrison | Jan. 10, 1950 |

FOREIGN PATENTS

| 724,526 | France | 1932 |

OTHER REFERENCES

Manual of Industrial Chemistry, vol. 1, 4th ed., 1925, page 353.
Chemical Abstracts, vol. 3, 1909, pages 2363–64.
Chemical Abstracts, vol. 42, 1948, page 8433.

UNITED STATES PATENT OFFICE

CERTIFICATE OF CORRECTION

Patent No. 2,880,099                                      March 31, 1959

Ludwig F. Audrieth

It is hereby certified that error appears in the printed specification of the above numbered patent requiring correction and that the said Letters Patent should read as corrected below.

Column 1, line 22, for "common stock," read -- common brick, --; lines 41 and 42, for "difficvulties" read -- difficulties --; line 70, for "obsorption" read -- absorption --; column 3, line 30, for "of clay" read -- of the clay --.

Signed and sealed this 15th day of December 1959.

(SEAL)
Attest:

KARL H. AXLINE                                              ROBERT C. WATSON
Attesting Officer                                          Commissioner of Patents